F. W. Robinson,
Drag Saw.
No. 2,117. Reissued Nov. 28, 1865.
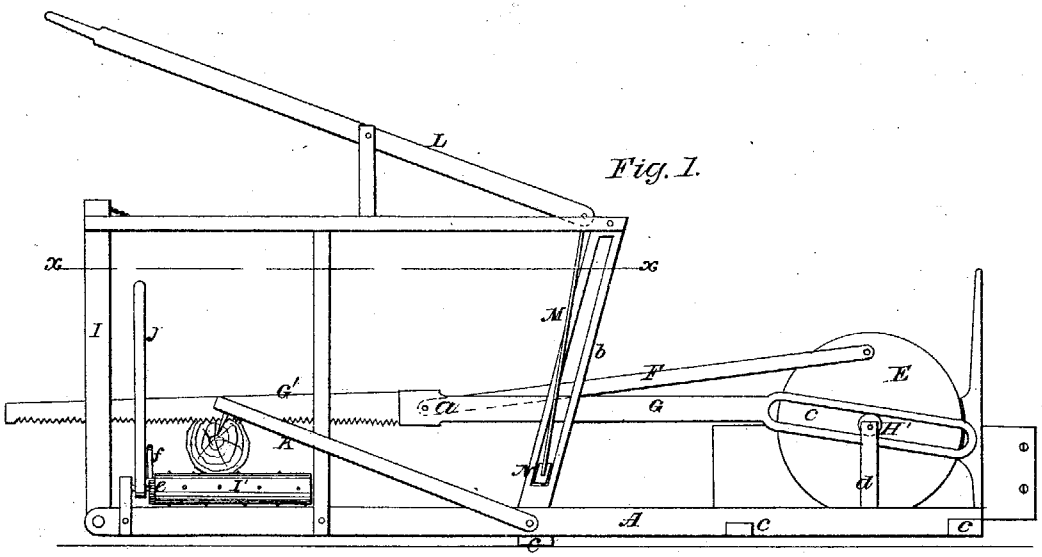
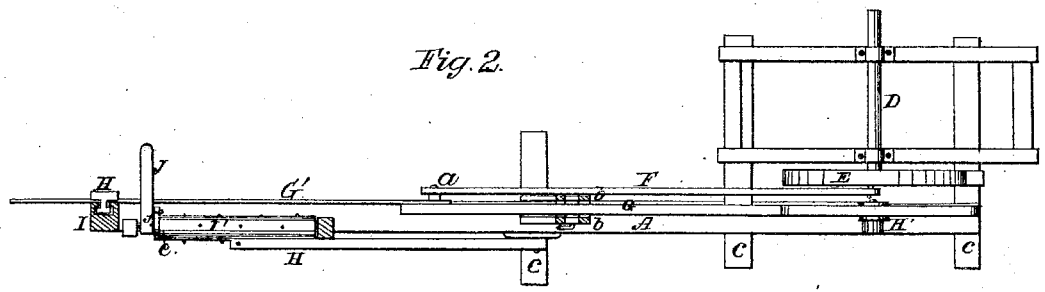
Witnesses:
Theo Luck
Wm Trewin
Inventor:
F. W. Robinson
per Munn & Co
Attorneys
AM. PHOTO-LITHO. CO. N.Y. (OSBORNE'S PROCESS)

UNITED STATES PATENT OFFICE.

F. W. ROBINSON, OF RICHMOND, INDIANA.

IMPROVEMENT IN SAWING-MACHINES.

Specification forming part of Letters Patent No. 49,791, dated September 5, 1865; Reissue No. 2,117, dated November 28, 1865.

*To all whom it may concern:*

Be it known that I, F. W. ROBINSON, of the city of Richmond, and State of Indiana, have invented certain new and useful Improvements in Drag-Saws; and I do hereby declare the following to be a full, clear, and exact description of the same, which will enable others skilled in the art to make and use the same, reference being had to the accompanying drawings, forming a part of this specification.

This invention relates to that class of drag-saws used for cross cutting timber, and is designed to produce a simple and durable machine composed of few parts and operating with little friction.

Figure 1 is a side view of my invention. Fig. 2 is a horizontal section of the same taken in the line *x x*, Fig. 1.

Similar letters of reference indicate like parts.

A represents a bar, which rests upon transverse bars C and forms the base of the framing of the machine.

D is a driving shaft, having upon it a crank-pulley, E, to which a pitman, F, is attached. This pitman is connected with the saw-bar G at the butt or heel of the saw G′, as shown at *a*.

G is a saw-bar, working between guides *b b*, which are attached to the bar A, and the saw has a guide, H, resting on its back or upper edge, said guide being fitted in a groove in a ratchet-bar, I, attached to the bar A or base of the machine. The saw-bar G is provided with a slot or opening in its back end of a length equal to the throw of the saw, and may be constructed either straight, or may be inclined downward, as shown in the drawings, said slot working upon a friction-roller, H′, on an upright attached to the base. To the front end of the saw-bar G the saw G′ is rigidly attached. The saw-bar G and the saw G′, reciprocating together, are held in position by the friction-roller H′ at the rear end, and the guides *b b* at the front end of bar G. The operation of the pitman F not only gives the reciprocating motion to the saw-bar and saw, but from its position gives a vertical pressure on the saw at each stroke, thereby increasing the force of the cut of the saw. It will readily be seen that by the use of the slotted saw-bar G, I obviate the necessity for cross-head and slides, thus doing away with the friction incident to their use, and by means of the slot C and roller H′ secure a perfect guide and bearing for the rear end of the saw-bar almost without friction. The rear end of the saw-bar may be arranged with inclined slides, or may terminate in a rod working in a suitable opening, or any similar or analogous device may be used to provide the proper guides and bearings at that point.

Any of the ordinary devices may be used in connection with my invention for carrying the logs to the saw, and also for raising the saw during this process.

It will be observed that during the operation of sawing the saw and saw-bar have only two bearings, the one upon the log to be sawed and the other upon the roller H′, placed at or near the driving-shaft, thus producing a pressure upon the saw while cutting, and at the same time generating a reciprocal motion of the saw with great simplicity.

When the bent saw bar, as shown in the drawings, is used, or by the use of dipped or inclined slides at the rear end of the saw-bar, a rocking motion will be given to the saw, which in large logs facilitates the clearing of saw-dust from the kerf, thus avoiding friction.

Having thus fully described my said invention, what I claim as new, and desire to secure by Letters Patent, is—

A drag-saw in which the saw is rigidly attached to the saw-bar when said saw-bar is provided with a slot at its rear end working upon or in guides situated at or near the driving-shaft.

F. W. ROBINSON.

Witnesses:
WM. T. DENNIS,
FRANK DENNIS.